US012696307B2

(12) United States Patent (10) Patent No.: US 12,696,307 B2
Liu et al. (45) Date of Patent: Jul. 28, 2026

(54) TRANSMISSION PROCESSING METHOD AND APPARATUS, AND ELECTRONIC DEVICE

(71) Applicant: VIVO MOBILE COMMUNICATION CO., LTD., Dongguan (CN)

(72) Inventors: Siqi Liu, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 624 days.

(21) Appl. No.: 17/985,999

(22) Filed: Nov. 14, 2022

(65) Prior Publication Data

US 2023/0072709 A1 Mar. 9, 2023

Related U.S. Application Data

(63) Continuation of application No. PCT/CN2021/093018, filed on May 11, 2021.

(30) Foreign Application Priority Data

May 15, 2020 (CN) .......................... 202010415377.9

(51) Int. Cl.
| | |
|---|---|
| *H04W 72/56* | (2023.01) |
| *H04L 1/1812* | (2023.01) |
| *H04L 5/00* | (2006.01) |
| *H04W 72/02* | (2009.01) |

(52) U.S. Cl.
CPC ........... *H04W 72/56* (2023.01); *H04L 1/1812* (2013.01); *H04L 5/0053* (2013.01); *H04W 72/02* (2013.01)

(58) Field of Classification Search
CPC .... H04L 1/1812; H04L 5/0053; H04W 72/02; H04W 72/56
See application file for complete search history.

(56) References Cited

U.S. PATENT DOCUMENTS

| | | | |
|---|---|---|---|
| 11,765,690 B2 * | 9/2023 | Huang | H04B 7/0456 370/329 |
| 2018/0049217 A1 | 2/2018 | Dinan et al. | |
| 2019/0053251 A1 | 2/2019 | Loehr et al. | |

(Continued)

FOREIGN PATENT DOCUMENTS

| | | |
|---|---|---|
| CN | 110536445 A | 12/2019 |
| CN | 110944390 A | 3/2020 |

(Continued)

OTHER PUBLICATIONS

CMCC, "Remaining issues on mode-1 resource allocation mechanism", 3GPP TSG RAN WG1 #100, e-Meeting, Feb. 24-Mar. 6, 2020, R1-2000747.

(Continued)

*Primary Examiner* — Brian J. Gillis
(74) *Attorney, Agent, or Firm* — The Webb Law Firm

(57) ABSTRACT

A transmission processing method includes: obtaining a first priority of sidelink reporting information, where the sidelink reporting information is reported to a network side device through a PUCCH or a PUSCH; and determining whether to transmit the sidelink reporting information based on the first priority; where the sidelink reporting information includes sidelink reporting information without a priority reference.

18 Claims, 2 Drawing Sheets

(56) References Cited

U.S. PATENT DOCUMENTS

| | | | |
|---|---|---|---|
| 2019/0124015 A1 | 4/2019 | Loehr et al. | |
| 2019/0261391 A1 | 8/2019 | Kundu et al. | |
| 2020/0145799 A1 | 5/2020 | Baghel et al. | |
| 2020/0196365 A1 | 6/2020 | Tang et al. | |
| 2020/0228292 A1* | 7/2020 | Nguyen | H04W 24/08 |
| 2021/0168762 A1* | 6/2021 | Huang | H04B 7/0456 |
| 2022/0150871 A1 | 5/2022 | Luo et al. | |
| 2022/0330266 A1* | 10/2022 | Huang | H04W 28/0268 |
| 2022/0368504 A1* | 11/2022 | Zhao | H04L 1/1854 |

FOREIGN PATENT DOCUMENTS

| | | |
|---|---|---|
| CN | 110945826 A | 3/2020 |
| CN | 110972297 A | 4/2020 |
| CN | 111083732 A | 4/2020 |
| CN | 111095856 A | 5/2020 |
| CN | 111107583 A | 5/2020 |
| EP | 4057550 A1 | 9/2022 |
| WO | 2019127284 A1 | 7/2019 |
| WO | 2020091346 A1 | 5/2020 |

OTHER PUBLICATIONS

Apple, "Remaining Details on Mode 1 Resource Allocation", 2020, 3GPP TSG RAN WG1, R1-2000851.

Ganesan et al., "5G V2X Architecture and Radio Aspects", IEEE Conference on Standards for Communications and Networking (CSCN), 2019.

Huawei, "Remaining details of sidelink resource allocation mode 1", 3GPP TSG RAN WG1, R1-2001551.

ITRI, "Remaining Issues on NR Sidelink Resource Allocation Mechanism for Mode 2", 3GPP TSG RAN WG1, R1-1912582.

Huawei et al., "Remaining details of physical layer procedures for sidelink", Apr. 20-30, 2020, 3GPP TSG RAN WG1, Meeting #100e-bis, R1-2001555, p. 1-18.

Lenovo et al., "Discussion on resource allocation for NR sidelink Mode 1", Apr. 20-30, 2020, 3GPP TSG RAN WG1, #100bis-e, R1-2001968, p. 1-6.

LG Electronics, "Discussion on physical layer procedures for NR sidelink", Apr. 20-30, 2020, 3GPP TSG RAN WG1, Meeting #100bis, R1-2001889, p. 1-18.

Samsung, "On Mode 1 for NR sidelink", Feb. 24-Mar. 6, 2020, 3GPP TSG RAN WG1, #100-e, R1-2000616, p. 1-10.

* cited by examiner

TRANSMISSION PROCESSING METHOD AND APPARATUS, AND ELECTRONIC DEVICE

CROSS-REFERENCE TO RELATED APPLICATIONS

This application is a Bypass Continuation Application of PCT/CN2021/093018 filed May 11, 2021, which claims priority to Chinese Patent Application No. 202010415377.9 filed May 15, 2020, the disclosures of which are hereby incorporated by reference in their entireties.

BACKGROUND OF THE INVENTION

Field of the Invention

This disclosure relates to the field of communications technologies, and in particular to a transmission processing method and apparatus, and an electronic device.

Description of Related Art

At present, a mobile communications system not only supports uplink transmission and downlink transmission, but also supports sidelink (SL) transmission. The sidelink transmission is used for direct transmission between terminals through no network device. In a new radio (NR) technology, two sidelink resource allocation modes are supported: a scheduled resource allocation mode (usually referred to as mode-1) and an autonomous resource selection mode. Mode-1: controlled by a network side device and allocating a resource for each user equipment UE.

In addition, to improve reliability and resource utilization of data transmission on a sidelink, a hybrid automatic repeat request (HARQ) feedback mechanism is also introduced in a sidelink technology: after a sidelink receiving user receives a physical sidelink control channel (PSCCH) and/or a physical sidelink shared channel (PSSCH), sidelink hybrid automatic repeat request acknowledgement (HARQ-ACK) information is fed back on a physical sidelink feedback channel (PSFCH) corresponding to the PSCCH and/or PSSCH, to indicate whether sidelink data transmission succeeds or fails. After a sidelink sending user receives the sidelink HARQ-ACK information on the sidelink, the sending user can know whether previous transmission succeeds or fails. It should be noted that a sidelink user may be a sending user or receiving user, that is, the same user can perform sending or receiving separately at different time or frequency domains.

Transmission of a data packet on a sidelink may be performed on a sidelink between users. Therefore, a control node may not directly know whether the transmission of the data packet on the sidelink succeeds, and the user needs to send the sidelink HARQ ACK information (such as sidelink acknowledgment/negative acknowledgment) (ACK/NACK) to the control node, so that the control node can further determine whether the transmission on the sidelink succeeds. In particular, in mode-1, the user reports SL HARQ information to the control node through an uplink resource (such as a physical uplink control channel (PUCCH) or physical uplink shared channel (PUSCH)).

In addition, in an NR system, the user will send the network side device (such as a base station) at least one of HARQ-ACK information, a channel state information (CSI) report, a service request (SR), or the like corresponding to transmission through a Uu interface.

However, the UE reports sidelink reporting information to the network side device through the uplink resource such as the PUCCH or PUSCH, the uplink resource may conflict with another uplink resource, or the uplink resource may conflict with a sidelink transmission resource. Therefore, transmission content cannot be specified.

SUMMARY OF THE INVENTION

According to a first aspect, an embodiment of this application provides a transmission processing method, including:

obtaining a first priority of sidelink reporting information, where the sidelink reporting information includes at least one of the following:

sidelink reporting information without a priority reference; or sidelink reporting information that satisfies a first preset condition.

According to a second aspect, an embodiment of this application provides a transmission processing apparatus, including:

a first obtaining module, configured to obtain a first priority of sidelink reporting information, where the sidelink reporting information includes at least one of the following:

sidelink reporting information without a priority reference; or sidelink reporting information that satisfies a first preset condition.

According to a third aspect, an embodiment of this application further provides an electronic device, where the electronic device includes a processor, a memory, and a program or an instruction that is stored in the memory and that can run on the processor, and when the program or the instruction is executed by the processor, the steps of the method according to the first aspect are implemented.

According to a fourth aspect, an embodiment of this application further provides a non-transitory readable storage medium, where the non-transitory readable storage medium stores a program or an instruction, and when the program or instruction is executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or an instruction, to implement the method according to the first aspect.

According to a sixth aspect, an embodiment of this application provides a computer software product, where the computer software product is stored in a non-volatile storage medium, and the software product is configured to be executed by at least one processor to implement the steps of the method according to the first aspect.

According to a seventh aspect, an embodiment of this application provides an electronic device, where the electronic device is configured to perform the method according to the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances so that the embodiments of this application can be implemented in other orders than the order illustrated or described herein. In addition, "and/or" in the specification and claims represents at least one of connected objects. Symbol "/" in the specification generally represents an "or" relationship between associated objects.

A transmission processing method provided according to embodiments of this application is described below through some embodiments and application scenarios with reference to the accompanying drawings.

The method of the embodiments of this application is applied to user equipment, and the user equipment (UE) may refer to an access terminal, a subscriber unit, a subscriber station, a mobile site, a mobile station, a remote station, a remote terminal, a mobile device, a user terminal, a terminal, a wireless communications device, a user agent, or a user apparatus. The terminal device may also be a cellular phone, a cordless phone, a session initiation protocol (SIP) phone, a wireless local loop (WLL) station, or a personal digital assistant (PDA), a handheld device with a wireless communication function, a computing device, another processing device connected to a wireless modem, an in-vehicle device, or a wearable device.

Figures 1, 2:
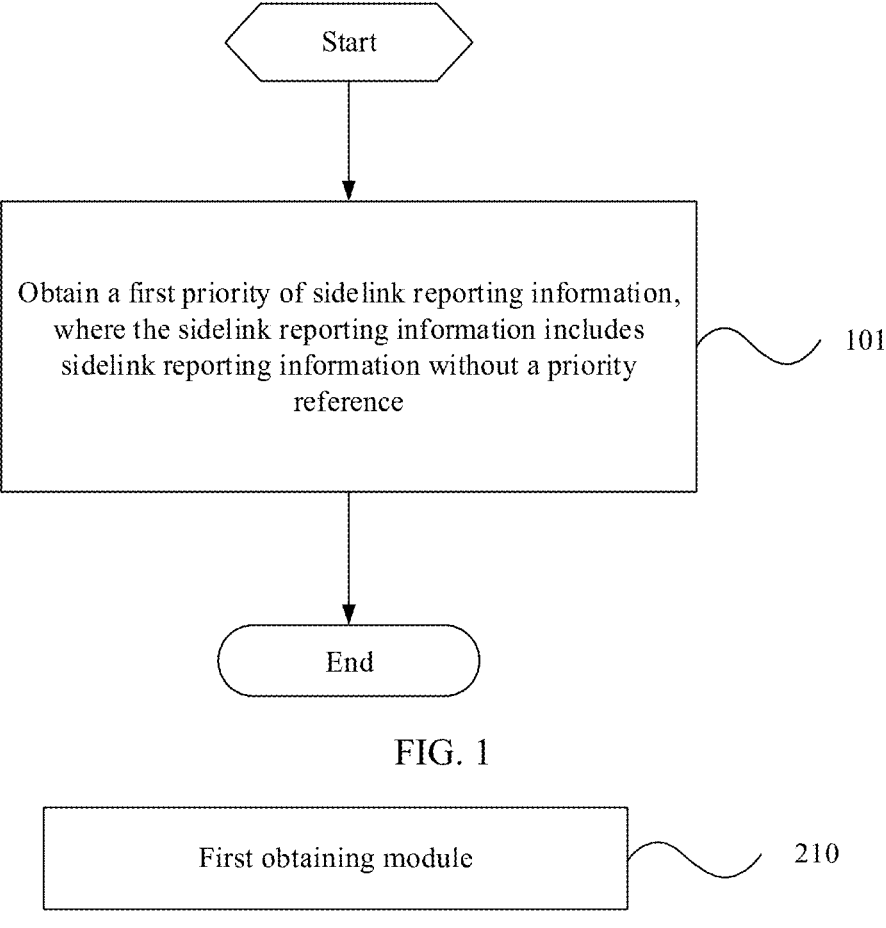
FIG. 1 is a schematic flowchart of a transmission processing method according to an embodiment of this application.
FIG. 2 is a schematic structural diagram of a transmission processing apparatus according to an embodiment of this application.

As shown in FIG. 1, a transmission processing method is provided according to an embodiment of this application, including:

Step 101: Obtain a first priority of sidelink reporting information, where the sidelink reporting information includes at least one of the following: sidelink reporting information without a priority reference; or sidelink reporting information that satisfies a first preset condition.

According to step 101, for at least one of the sidelink reporting information without a priority reference or the sidelink reporting information that satisfies a first preset condition, a user equipment will further obtain the first priority of the sidelink reporting information, to subsequently determine whether to transmit the sidelink reporting information based on the first priority, thereby performing effective transmission.

Optionally, the first priority is configured, pre-configured, indicated by another user, or predefined.

This way, in this embodiment, on the one hand, a priority of sidelink reporting information corresponding to a sidelink transmission resource without a priority, a priority of the sidelink reporting information without a priority reference, and a priority of the sidelink reporting information that satisfies the first preset condition can be configured, pre-configured, indicated by another user, or pre-defined. Configuration may be configuration by a network-side device, such as configuration by a base station. Pre-configuration may be pre-configuration by a manufacturer. Predefinition may be predefinition through a protocol.

For example, the base station performs configuration by using at least one of radio resource control (RRC), a system information block (SIB), medium access control (MAC) layer signaling, radio link control (RLC) layer signaling, packet data convergence protocol (PDCP) layer signaling, service data adaptation protocol (SDAP) layer signaling, or physical layer signaling (such as downlink control information (DCI)). In addition or alternatively, another user performs indication by using at least one of PC5 RRC, SL MAC layer signaling, SL RLC layer signaling, SL another higher layer signaling, or SL physical layer signaling (such as sidelink control information (SCI)).

Optionally, in this embodiment, after step 101, the method further includes:

obtaining a second priority of information carried by a preset resource; and determining whether to transmit the sidelink reporting information according to the first priority and/or the second priority, where the preset resource is a transmission resource for uplink reporting information, the preset resource is a sidelink transmission resource, or the preset resource is a resource for transmitting uplink data.

This way, it can be determined, according to the obtained first priority and/or the second priority, whether to transmit the sidelink reporting information, especially in the case of a resource conflict, to avoid a transmission failure caused by the resource conflict.

In this embodiment, it can be determined whether to transmit the sidelink reporting information according to the obtained first priority and/or second priority. Optionally, the second priority is configured, pre-configured, indicated by another user, or predefined. That is, a priority of the preset resource may also be configured, pre-configured, indicated by another user, or predefined.

Optionally, determining whether to transmit the sidelink reporting information according to the first priority and/or the second priority includes:

determining, in a case that a second preset condition is satisfied between a transmission resource for the sidelink reporting information and the preset resource, whether to transmit the sidelink reporting information according to the first priority and/or the second priority, where the second preset condition is that a time domain and/or frequency domain overlap at least partially; or the second preset condition is being in a same time domain range, and/or in a same frequency domain range.

This way, the method in this embodiment of this application can be applied to a scenario where the second preset condition is satisfied between the transmission resource for the sidelink reporting information and the transmission resource for the uplink reporting information, a scenario where the second preset condition is satisfied between the transmission resource for the sidelink reporting information and the sidelink transmission resource, or a scenario where the second preset condition is satisfied between the transmission resource for the sidelink reporting information and the resource for transmitting uplink data. For example, the preset resource is a physical uplink shared channel PUSCH. According to the method in this embodiment of this application, when it is determined that the sidelink reporting information needs to be transmitted, one implementation is that the sidelink reporting information can be multiplexed on the PUSCH for transmission.

In the second preset condition, the same time domain range may be a same slot; the same frequency domain range may be a same BWP.

This way, the second preset condition is satisfied when the transmission resource for the sidelink reporting information at least partially overlaps a time domain and/or frequency domain of the preset resource; or the second preset condition is satisfied when the transmission resource for the sidelink reporting information and the preset resource are in a same time domain range, and/or are in a same frequency domain range. Definitely, when the transmission resource for the sidelink reporting information and the preset resource are in the same time domain range, time domains of the two resources may at least partially overlap or may not overlap; similarly, when the transmission resource for the sidelink reporting information and the preset resource are in the same frequency domain range, the frequency domains of the two resource may at least partially overlap or may not overlap.

The determining whether to transmit the sidelink reporting information includes:

if a priority of configured, pre-configured, another-user indicated, or predefined sidelink reporting information is lower than that of information carried by a preset resource, or a priority value of the configured, pre-configured, another-user indicated, or predefined sidelink reporting information is higher than that of the information carried by the preset resource, skipping transmitting the sidelink reporting information, and/or transmitting the information carried by the preset resource;

if a priority of configured, pre-configured, another-user indicated, or predefined sidelink reporting information is higher than that of information carried by a preset resource, or a priority value of the configured, pre-configured, another-user indicated, or predefined sidelink reporting information is lower than that of the information carried by the preset resource, transmitting the sidelink reporting information, and/or skipping transmitting the information carried by the preset resource;

if a priority of configured, pre-configured, another-user indicated, or predefined sidelink reporting information is higher than that of the sidelink transmission resource, or a priority value of the configured, pre-configured, another-user indicated, or predefined sidelink reporting information is lower than that of the sidelink transmission resource, transmitting the sidelink reporting information, and/or skipping transmitting the sidelink transmission resource; or if a priority of configured, pre-configured, another-user indicated, or predefined sidelink reporting information is lower than that of the sidelink transmission resource, or a priority value of the configured, pre-configured, another-user indicated, or predefined sidelink reporting information is higher than that of the sidelink transmission resource, skipping transmitting the sidelink reporting information, and/or transmitting the sidelink transmission resource.

In this case, a possible implementation is that as a priority is lower, a corresponding priority value is higher. Another possible implementation is that as a priority is lower, a corresponding priority value is lower. In this case, a higher priority value in the foregoing explanation needs to be replaced with a lower priority value, and a lower priority value needs to be replaced with a higher priority value.

In this embodiment, the sidelink reporting information, that is, the SL reporting information, includes at least one of SL CSI or SL HARQ information; and the uplink reporting information includes at least one of HARQ information, CSI information, or SR corresponding to transmission through a Uu interface, and is not limited to the foregoing content.

In this embodiment, optionally, the sidelink reporting information that satisfies the first preset condition includes at least one of the following:

first sidelink reporting information, including only negative acknowledgment;

second sidelink reporting information, including negative acknowledgment, where the negative acknowledgment corresponds to unicast;

third sidelink reporting information, including negative acknowledgment, where the negative acknowledgment corresponds to multicast and a feedback mechanism is an ACK/NACK feedback mechanism;

fourth sidelink reporting information, including negative acknowledgment, where the negative acknowledgment corresponds to multicast and a feedback mechanism is a NACK-only feedback mechanism;

fifth sidelink reporting information, including only acknowledgment;

sixth sidelink reporting information, where the sixth sidelink reporting information is sidelink hybrid automatic repeat request information corresponding to unuse of any sidelink configured grant resources;

seventh sidelink reporting information, corresponding to at least one undetected target physical sidelink feedback channel resource;

eighth sidelink reporting information, where the eighth sidelink reporting information is corresponding sidelink hybrid automatic repeat request information when the number of sidelink transmission times reaches a preset number of transmission times;

ninth sidelink reporting information, where the ninth sidelink reporting information is corresponding sidelink hybrid automatic repeat request information in a case that at least sidelink transmission is performed on one last candidate resource of a preset number of candidate resources; or tenth sidelink reporting information, including at least sidelink channel state information.

This way, for the foregoing SL reporting information that satisfies a first preset condition, the first priority of the SL reporting information may be configured, pre-configured, indicated by another user, or pre-defined.

For example, what is configured by the base station through SIB or RRC includes negative acknowledgment. A priority of SL reporting information which is that the negative acknowledgment corresponds to multicast and a feedback mechanism is the NACK-only feedback mechanism is p_c; a priority of SL reporting information that includes only acknowledgment is p_d; and a priority of SL reporting information corresponding to at least one undetected target physical sidelink feedback channel resource is p_i.

Alternatively, what is pre-configured by a manufacturer includes negative acknowledgment. A priority of SL reporting information which is that the negative acknowledgment corresponds to multicast and a feedback mechanism is the NACK-only feedback mechanism is p_c'; a priority of SL reporting information that includes only acknowledgment is p_d'; and a priority of SL reporting information corresponding to at least one undetected target physical sidelink feedback channel resource configured by the base station through SIB or RRC is p_i'.

Alternatively, what is pre-defined through a protocol includes negative acknowledgment. A priority of SL reporting information which is that the negative acknowledgment corresponds to multicast and a feedback mechanism is the NACK-only feedback mechanism is p_c''; a priority of SL reporting information that includes only acknowledgment is p_d''; and a priority of SL reporting information corresponding to at least one undetected target physical sidelink feedback channel resource configured by the base station through SIB or RRC is p_i''.

Alternatively, a configured, pre-configured, or protocol-predefined priority of SL reporting information including SL SCI is a priority of MAC CE for transmitting SL CSI, and/or a priority for requesting a physical sidelink shared channel PSSCH where a CSI request of SL CSI is located.

In this embodiment, the sidelink reporting information includes only the negative acknowledgment. For example, the SL reporting information has N1 bit and is N1 bit NACK. Or The sidelink reporting information includes only acknowledgment. For example, the SL reporting information has N2 bits and is N2 bit ACK.

The feedback mechanism is the NACK-only feedback mechanism and the ACK/NACK feedback mechanism supported by multiple receivers when performing HARQ feedback in NR sidelink multicast. Optionally, the NACK-only feedback mechanism is: NACK is fed back if data is received but cannot be decoded successfully, and no feedback is given in other cases. The ACK/NACK feedback mechanism is: NACK is fed back if data is received but cannot be decoded, or sidelink control information SCI is received but no data is received; or ACK is fed back if data is received and correctly decoded.

The target physical sidelink feedback channel resource is a physical sidelink feedback channel resource PSFCH for specific transmission, which includes at least one of multicast transmission of the NACK-only feedback mechanism, multicast transmission of the ACK/NACK feedback mechanism, or unicast transmission, but is not limited to the foregoing content. If the sidelink reporting information is SL HARQ information and corresponds to at least one undetected target physical sidelink feedback channel resource, it means that the SL HARQ information is corresponding SL HARQ information in a case that at least one PSFCH of the PSFCH corresponding to the specific transmission is not detected.

The preset number and/or the preset number of transmission times may be dynamically scheduled, for example, related to DCI. The preset number and/or the preset number of transmission times may also be semi-statically scheduled, for example, related to sidelink configured grant (SL CG), the preset number is the number of resources on the SL CG, and the preset number of transmission times is the preset number of transmission times on the SL CG.

Optionally, in this embodiment, the sidelink reporting information without the priority reference satisfies at least one of the following:

the sidelink reporting information corresponding to unuse of any sidelink configured grant resources;

the sidelink reporting information corresponding to a canceled sidelink transmission resource; or the sidelink reporting information corresponding to a target transmission type.

This way, a first priority of the sidelink reporting information without a priority reference may also be configured, pre-configured, indicated by another user, or pre-defined. The sidelink reporting information without a priority reference may also be understood as sidelink reporting information corresponding to a sidelink transmission resource without a priority.

This way, in this embodiment, a priority of at least one of the following sidelink reporting information is configured, pre-configured, indicated by another user, or predefined:

the sidelink reporting information that includes only negative acknowledgment;

the sidelink reporting information that includes negative acknowledgment which corresponds to unicast;

the sidelink reporting information that includes negative acknowledgment which corresponds to multicast and a feedback mechanism is the ACK/NACK feedback mechanism;

the sidelink reporting information that includes negative acknowledgment which corresponds to multicast and a feedback mechanism is the NACK-only feedback mechanism;

the sidelink reporting information that includes only acknowledgment;

the sidelink reporting information corresponding to unuse of all the sidelink configured grant resources;

the sidelink reporting information corresponding to at least one undetected target physical sidelink feedback channel resource;

the sidelink reporting information of corresponding sidelink hybrid automatic repeat request information in a case that at least sidelink transmission is performed on one last candidate resource of a preset number of candidate resources;

the sidelink reporting information including at least sidelink channel state information;

the sidelink reporting information corresponding to the canceled sidelink transmission resource; or the sidelink reporting information corresponding to the target transmission type.

In this embodiment, optionally, the sidelink transmission resource includes at least one of the following:

a physical sidelink shared channel resource;

a physical sidelink control channel resource; or a physical sidelink feedback channel resource.

This way, the sidelink transmission resource may be at least one resource of the PSSCH, PSCCH, or PSFCH.

The canceled sidelink transmission resource can also be understood as an abandoned sidelink transmission resource. Alternatively, the canceled sidelink transmission resource can be understood as canceled or abandoned sidelink transmission, for example, canceled PSSCH and/or PSSCH transmission due to priority comparison, canceled PSFCH receiving, or the like.

Taking the PSSCH as an example, if the sidelink reporting information is the SL HARQ information, but PSSCH transmission corresponding to the SL HARQ information is canceled, that is, no PSSCH transmission is performed. For example, no PSSCH is sent. Therefore, the PSSCH can be regarded as the canceled sidelink transmission resource, and the sidelink reporting information corresponds to the canceled sidelink transmission resource. Taking the PSFCH as an example, if the sidelink reporting information is the SL HARQ information, but PSFCH transmission corresponding to the SL HARQ information is canceled, that is, no PSFCH transmission is performed. For example, no PSFCH is received. Therefore, the PSFCH can be regarded as the canceled sidelink transmission resource, and the sidelink reporting information corresponds to the canceled sidelink transmission resource.

In addition, in this embodiment, the first priority can also be obtained for an illustrative scenario.

Optionally, step 101 includes:

determining the first priority as a priority of a canceled sidelink transmission resource in a case that the sidelink reporting information corresponds to the canceled sidelink transmission resource.

This way, in a case that the sidelink reporting information corresponds to the canceled sidelink transmission resource, the first priority is determined as the priority of the canceled sidelink transmission resource.

For example, the priority of the SL reporting information is a priority of a canceled PSSCH; the priority of the SL reporting information is a priority of a canceled PSCCH; or the priority of the SL reporting information is a priority of a canceled PSFCH.

In this embodiment, the priority of the PSSCH may be a priority indicated through SCI for scheduling the PSSCH, or may be a priority of the PSSCH itself.

Since the PSFCH corresponds to the PSSCH and/or the PSCCH, optionally, in a case that the sidelink reporting information corresponds to a canceled physical sidelink feedback channel resource, the first priority is determined as a priority of the physical sidelink shared channel resource and/or physical sidelink control channel resource corresponding to the canceled physical sidelink feedback channel resource.

This way, if the canceled sidelink transmission resource is the PSFCH, in a case that the SL reporting information corresponds to the canceled PSFCH, the priority of the SL reporting information is determined as the priority of the corresponding PSSCH and/or PSCCH of the PSFCH.

Optionally, step 101 includes:

determining the first priority as a priority of a physical sidelink shared channel resource and/or physical sidelink control channel resource for corresponding sidelink transmission in a case that the sidelink reporting information corresponds to a target transmission type.

Optionally, the target transmission type includes at least one of the following:

blind transmission;

blind retransmission;

transmission with disabled hybrid automatic repeat request HARQ feedback;

broadcast transmission;

transmission that not supports HARQ feedback; or transmission in a resource pool, bandwidth part BWP, or a carrier not configured with a physical sidelink feedback channel.

This way, the priority of the sidelink reporting information of the target transmission type is the priority of the PSSCH and/or PSCCH for corresponding sidelink transmission.

Optionally, step 101 includes:

determining the first priority as a priority of a physical sidelink shared channel resource and/or a physical sidelink control channel resource for corresponding sidelink transmission in a case that the sidelink reporting information corresponds to at least one undetected target physical sidelink feedback channel resource.

This way, in a case that the sidelink reporting information corresponds to at least one undetected target physical sidelink feedback channel resource, the priority of the sidelink reporting information is the priority of the PSSCH and/or PSCCH for the corresponding sidelink transmission.

It can be known from the foregoing content that the target physical sidelink feedback channel resource is a physical sidelink feedback channel resource PSFCH for specific transmission, which includes at least one of transmission of the NACK-only feedback mechanism, multicast transmission of the ACK/NACK feedback mechanism, or unicast transmission, but is not limited to the foregoing content. For example, the sidelink reporting information is SL HARQ information, and the SL HARQ information is corresponding SL HARQ information in a case that at least one PSFCH of a PSFCH corresponding to multicast of the NACK-only feedback mechanism, a PSFCH corresponding to multicast of the ACK/NACK feedback mechanism, or a PSFCH corresponding to unicast is not detected, where the SL HARQ information is the priority of the PSSCH and/or PSCCH for specific transmission.

Optionally, in a case that the user equipment performs multicast of the NACK-only feedback mechanism, the priority of the SL reporting information is the priority of the PSSCH and/or PSCCH for sidelink transmission.

Optionally, step 101 includes:

determining the first priority as a priority of a sidelink transmission resource corresponding to sidelink transmission in a case that the sidelink reporting information is corresponding sidelink hybrid automatic repeat request information in a case that a number of sidelink transmission times reaches a preset number of transmission times.

Optionally, that the number of the sidelink transmission times reaches the preset number of transmission times may be that the number of transmission times of a sidelink transmission block reaches the preset number of transmission times. Therefore, if the sidelink reporting information is SL HARQ information, and the actual number of transmission times of a transport block (TB) reaches the preset number of transmission times $N_{max}$, a priority of the SL HARQ information is the same as a priority of at least one of a PSSCH, PSCCH, or PFSCH for the transmission.

Optionally, in a case that the number of sidelink transmission times reaches the preset number of transmission times, the priority of sidelink reporting information is a priority of a PSSCH and/or PSCCH for transmission the last time.

Optionally, in a case that the number of sidelink transmission times reaches the preset number of transmission times, the priority of the sidelink reporting information is a priority of a PFSCH for transmission the last time.

Optionally, step 101 includes:

determining, in a case that the sidelink reporting information is corresponding sidelink hybrid automatic repeat request information in a case that at least sidelink transmission is performed on one last candidate resource of a preset number of candidate resources, the first priority as a priority of a sidelink transmission resource corresponding to the sidelink transmission.

If the sidelink reporting information is SL HARQ information, three resources are provided in one CG, and the UE starts transmission from the third resource, even only once. In this case, the SL HARQ information corresponds to performing sidelink transmission at least on the last candidate resource of the preset number of candidate resources.

Definitely, the preset number of transmission times and the preset number of times can apply to first transmission or retransmission.

In this embodiment, in a case that a second preset condition is satisfied between a transmission resource for the sidelink reporting information and the preset resource, if the sidelink reporting information is not to be transmitted, optionally, the first priority is the lowest priority of priorities corresponding to target resources, and the target resources are a resource set where a sidelink transmission resource corresponding to the sidelink reporting information is located; or the first priority is the lowest priority of preset priorities.

This way, the priority of the sidelink reporting information will be the lowest priority of the priorities corresponding to the target resources, or the lowest priority of the preset priorities, and then the sidelink reporting information will not be transmitted.

Here, the lowest priority is the lowest priority of priorities configured or pre-configured for the target resources corresponding to the SL reporting information or the lowest priority of priorities allowed for the target resources. The configuration can be either configuration by the base station or configuration by a high layer (configured by high layer).

The target resources are a resource set where the sidelink transmission resource corresponding to the sidelink reporting information configured or pre-configured with the target resources is located. Optionally, the target resource includes at least one of the following:

sidelink configured grant resources;
a resource pool;
bandwidth parts; or
carriers.

For example, it is assumed that the priority is increasingly lower as a priority value is increasingly greater. The sidelink reporting information is determined by transmission in a resource pool. Configured, pre-configured, or allowed priorities for the resource pool are from 3 to 8. This way, the currently lowest priority is 8, and the priority of the sidelink reporting information is 8. Alternatively, the SL reporting information is determined based on transmission of the sidelink configured grant SL CG or a feedback resource, and SL-CG-configured, pre-configured, or allowed priorities are from 2 to 8. This way, the currently lowest priority is 8, and the priority of the sidelink reporting information is 8. Alternatively, priorities specified in a protocol are from 1 to 8. This way, the currently lowest priority is 8, and the priority of the sidelink reporting information is 8.

In this embodiment, skipping transmitting the sidelink reporting information can also be understood as abandoning or canceling the sidelink reporting information. Skipping transmitting information carried by the preset resource can also be understood as abandoning or canceling the information carried by the preset resource. Skipping transmitting the sidelink transmission resource can also be understood as abandoning or canceling the sidelink transmission resource.

In addition, in this embodiment, transmission includes at least one of receiving or sending.

The following describes application of the method in this embodiment of this application with reference to an illustrative scenario:

in a case that the transmission resource for the SL reporting information and a resource for performing uplink reporting information satisfies the second preset condition, and the SL reporting information is a combination of one or more of the following:

1. SL reporting information corresponding to that a SL HARQ feedback is disabled;
2. SL reporting information corresponding to that the SL CG is not actually used;

3. SL reporting information corresponding to that the maximum number of transmission times or the maximum number of retransmission times is reached; or
4. SL reporting information caused by a canceled sidelink transmission resource, or SL reporting information caused by internal priority comparison by a user, for example, in a case that multiple types of transmission are performed simultaneously by the user, SL reporting information generated by cancellation of the PSSCH, PSCCH, and/or PSFCH based on priorities.

In this case, the configured, pre-configured, defined, or another-terminal-indicated priority of the SL reporting information is the lowest, or the configured, pre-configured, defined, or another-terminal-indicated priority of the SL reporting information is lower than that of the uplink reporting information.

Alternatively, in the case of SL reporting information caused by the canceled sidelink transmission resource, the terminal considers, configures, pre-configures, or defines, or another terminal indicates that: the priority of the SL reporting information is lower than a priority of canceled PSSCH or PSFCH transmission, or equal to a priority of PSSCH or PSFCH originally to be transmitted. For example, a priority of SL reporting information caused by cancellation of PSSCH transmission is equal to a priority of a PSSCH originally to be transmitted, or a priority caused by cancellation of PSFCH receiving is equal to a priority of a PSFCH originally to be received. Optionally, the priority of the PSFCH may be a priority indicated by its corresponding PSCCH or a priority corresponding to its PSSCH, or a configured, pre-configured, defined, or another-user-indicated priority.

To sum up, in the method provided in the embodiments of this application, for at least one of the sidelink reporting information without a priority reference or the sidelink reporting information that satisfies a first preset condition, the first priority of the sidelink reporting information will be further obtained, so that it can be subsequently determined whether to transmit the sidelink reporting information based on the first priority, and then effective transmission can be performed.

It should be noted that, in the transmission processing method provided in the embodiments of this application, an execution body may be a transmission processing apparatus, or a control module in the transmission processing apparatus configured to execute and load the transmission processing method. In an embodiment of this application, an example in which the transmission processing apparatus executes and loads the transmission processing method is used as an example, to describe the transmission processing method provided in the embodiments of this application.

FIG. 2 is a block diagram of a transmission processing apparatus according to an embodiment of this application. The transmission processing apparatus shown in FIG. 2 includes a first obtaining module 210.

The first obtaining module 210 is configured to obtain a first priority of sidelink reporting information, where the sidelink reporting information includes at least one of the following:

sidelink reporting information without a priority reference; or sidelink reporting information that satisfies a first preset condition.

Optionally, the apparatus further includes:

a second obtaining module, configured to obtain a second priority of information carried by a preset resource; and a processing module, configured to determine whether to transmit the sidelink reporting information according to the first priority and/or the second priority, where the preset resource is a transmission resource for uplink reporting information, the preset resource is a sidelink transmission resource, or the preset resource is a resource for transmitting uplink data.

Optionally, the sidelink reporting information that satisfies a first preset condition includes at least one of the following:

first sidelink reporting information, including only negative acknowledgment;

second sidelink reporting information, including negative acknowledgment, where the negative acknowledgment corresponds to unicast;

third sidelink reporting information, including negative acknowledgment, where the negative acknowledgment corresponds to multicast and a feedback mechanism is an ACK/NACK feedback mechanism;

fourth sidelink reporting information, including negative acknowledgment, where the negative acknowledgment corresponds to multicast and a feedback mechanism is a NACK-only feedback mechanism;

fifth sidelink reporting information, including only acknowledgment;

sixth sidelink reporting information, where the sixth sidelink reporting information is sidelink hybrid automatic repeat request information corresponding to unuse of any sidelink configured grant resources;

seventh sidelink reporting information, corresponding to at least one undetected target physical sidelink feedback channel resource;

eighth sidelink reporting information, where the eighth sidelink reporting information is corresponding sidelink hybrid automatic repeat request information when the number of sidelink transmission times reaches a preset number of transmission times;

ninth sidelink reporting information, where the ninth sidelink reporting information is corresponding sidelink hybrid automatic repeat request information in a case that at least sidelink transmission is performed on one last candidate resource of a preset number of candidate resources; or tenth sidelink reporting information, including at least sidelink channel state information.

Optionally, the sidelink reporting information without a priority reference satisfies at least one of the following:

the sidelink reporting information corresponding to unuse of any sidelink configured grant resources;

the sidelink reporting information corresponding to a canceled sidelink transmission resource; or the sidelink reporting information corresponding to a target transmission type.

Optionally, the first obtaining module is further configured to:

determine the first priority as a priority of a canceled sidelink transmission resource in a case that the sidelink reporting information corresponds to the canceled sidelink transmission resource.

Optionally, the first obtaining module is further configured to:

determine, in a case that the sidelink reporting information corresponds to a canceled physical sidelink feedback channel resource, the first priority as a priority of a physical sidelink shared channel resource and/or a physical sidelink control channel resource corresponding to the canceled physical sidelink feedback channel resource.

Optionally, the first obtaining module is further configured to:

determine the first priority as a priority of a physical sidelink shared channel resource and/or physical sidelink control channel resource for corresponding sidelink transmission in a case that the sidelink reporting information corresponds to a target transmission type.

Optionally, the target transmission type includes at least one of the following:

blind transmission;

blind retransmission;

transmission with disabled hybrid automatic repeat request HARQ feedback;

broadcast transmission;

transmission that not supports HARQ feedback; or transmission in a resource pool, bandwidth part BWP, or a carrier not configured with a physical sidelink feedback channel.

Optionally, the first obtaining module is further configured to:

determine the first priority as a priority of a physical sidelink shared channel resource and/or a physical sidelink control channel resource for corresponding sidelink transmission in a case that the sidelink reporting information corresponds to at least one undetected target physical sidelink feedback channel resource.

Optionally, the first obtaining module is further configured to:

determine the first priority as a priority of a sidelink transmission resource corresponding to sidelink transmission in a case that the sidelink reporting information is corresponding sidelink hybrid automatic repeat request information in a case that a number of sidelink transmission times reaches the preset number of transmission times.

Optionally, the first obtaining module is further configured to:

determine, in a case that the sidelink reporting information is corresponding sidelink hybrid automatic repeat request information in a case that at least sidelink transmission is performed on one last candidate resource of a preset number of candidate resources, the first priority as a priority of a sidelink transmission resource corresponding to the sidelink transmission.

Optionally, the first priority is the lowest priority of priorities corresponding to target resources, and the target resources are a resource set where the sidelink transmission resource corresponding to the sidelink reporting information is located; or the first priority is the lowest priority of preset priorities.

Optionally, the target resource includes at least one of the following:

sidelink configured grant resources;

a resource pool;

bandwidth parts; or carriers.

Optionally, the processing module is further configured to:

determine, in a case that a second preset condition is satisfied between a transmission resource for the sidelink reporting information and the preset resource, whether to transmit the sidelink reporting information according to the first priority and/or the second priority, where the second preset condition is that a time domain and/or frequency domain overlap at least partially; or the second preset condition is being in a same time domain range, and/or in a same frequency domain range.

Optionally, the first priority is configured, pre-configured, indicated by another user, or predefined.

Optionally, the sidelink transmission resource includes at least one of the following:

a physical sidelink shared channel resource;

a physical sidelink control channel resource; or a physical sidelink feedback channel resource.

Optionally, the second priority is configured, pre-configured, indicated by another user, or predefined. The transmission processing apparatus in this embodiment of this application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The transmission processing apparatus in this embodiment of this application may be an apparatus with an operating system. The operating system may be an Android operating system, an iOS operating system, or another possible operating system, which is not specifically limited in the embodiments of this application.

The transmission processing apparatus provided in this embodiment of this application can implement each process implemented by the user-side device in the method embodiment of FIG. 1, which is not repeated herein to avoid repetition.

In the apparatus provided in the embodiments of this application, for at least one of the sidelink reporting information without a priority reference corresponding to a sidelink transmission resource or the sidelink reporting information that satisfies the first preset condition, the first priority of the sidelink reporting information will be further obtained, so that it can be subsequently determined whether to transmit the sidelink reporting information based on the first priority, and then effective transmission can be performed.

Optionally, an embodiment of this application further provides an electronic device, including a processor, a memory, and a program or an instruction stored in the memory and capable of running on the processor. When the program or the instruction is executed by the processor, the processes of the foregoing embodiments of the transmission processing method are implemented, and a same technical effect can be achieved. To avoid repetition, details are not described herein again.

It should be noted that the electronic device in this embodiment of this application includes the foregoing mobile electronic device and non-mobile electronic device.

Figure 3:
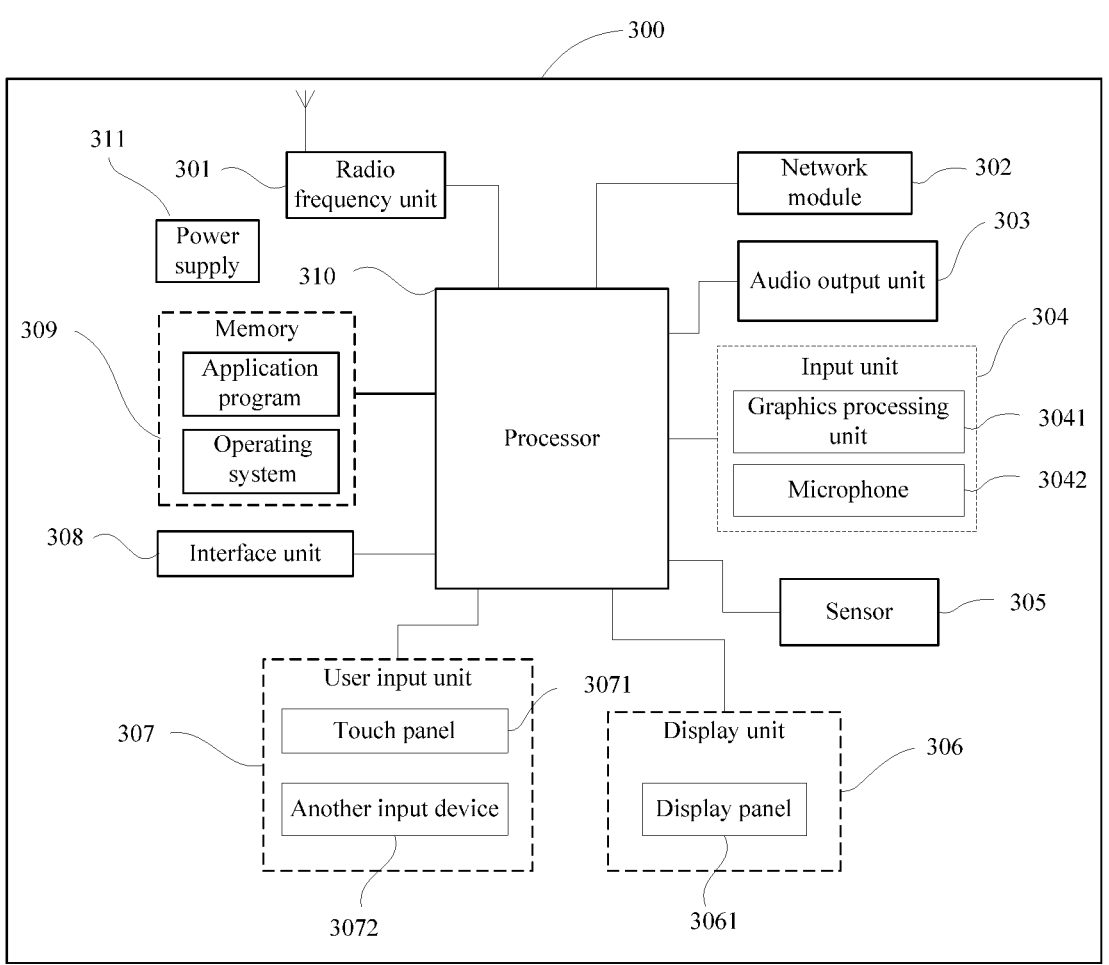
FIG. 3 is a schematic structural diagram of an electronic device according to an embodiment of this application.

FIG. 3 is a schematic structural diagram of hardware of an electronic device for implementing embodiments of this application.

The electronic device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311.

A person skilled in the art may understand that a structure of the electronic device shown in FIG. 3 constitutes no limitation on the electronic device, and the electronic device may include more or fewer components than those shown in the figure, or have a combination of some components, or have a different component arrangement. In this embodiment of this application, the electronic device includes but is not limited to a mobile phone, a tablet computer, a notebook computer, a palmtop computer, an in-vehicle terminal, a wearable device, a pedometer, and the like.

The processor 310 is configured to obtain a first priority of sidelink reporting information, where the sidelink reporting information includes at least one of the following: sidelink reporting information without a priority reference; or sidelink reporting information that satisfies a first preset condition.

It can be seen that the electronic device will further obtain, for at least one of the sidelink reporting information without a priority reference or the sidelink reporting information that satisfies a first preset condition, the first priority of the sidelink reporting information, so that it can be subsequently determined whether to transmit the sidelink reporting information based on the first priority, and then effective transmission can be performed.

It should be understood that, in this embodiment of this application, the radio frequency unit 301 may be configured to receive and send information or a signal in a call process. For example, after receiving downlink data from a base station, the radio frequency unit 301 sends the downlink data to the processor 310 for processing. In addition, the radio frequency unit 301 sends uplink data to the base station. Usually, the radio frequency unit 301 includes but is not limited to an antenna, at least one amplifier, a transceiver, a coupler, a low noise amplifier, a duplexer, and the like. In addition, the radio frequency unit 301 may further communicate with a network and another device through a wireless communications system.

The electronic device provides users with wireless broadband Internet access through the network module 302, for example, helps users receive and send e-mails, browse web pages, and access streaming media.

The audio output unit 303 may convert audio data received by the radio frequency unit 301 or the network module 302 or stored in the memory 309 into an audio signal and output the audio signal as sound. Moreover, the audio output unit 303 can further provide audio output related to a specific function performed by the electronic device 300 (for example, call signal received sound and message received sound). The audio output unit 303 includes a speaker, a buzzer, a telephone receiver, and the like.

The input unit 304 is configured to receive an audio signal or a video signal. The input unit 304 may include a graphics processing unit (GPU) 3041 and a microphone 3042. The graphics processing unit 3041 is configured to process image data of a static picture or a video obtained by an image capturing device (for example, a camera) in a video capturing mode or an image capturing mode. A processed image frame may be displayed on the display unit 306. The image frame processed by the graphics processing unit 3041 may be stored in the memory 309 (or another storage medium) or sent via the radio frequency unit 301 or the network module 302. The microphone 3042 may receive sound and can process such sound into audio data. Processed audio data may be converted, in a call mode, into a format that can be sent to a mobile communication base station by using the radio frequency unit 301 for output.

The electronic device 300 further includes at least one sensor 305, for example, a light sensor, a motion sensor, and another sensor. Optionally, the light sensor includes an ambient light sensor and a proximity sensor. The ambient light sensor may adjust luminance of the display panel 3061 based on brightness of ambient light. The proximity sensor may turn off the display panel 3061 and/or backlight when the electronic device 300 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by a user or information provided for a user. The display unit 306 may include the display panel 3061, and the display panel 3061 may be configured in a form of a liquid crystal display (LCD), an organic light-emitting diode (OLED), or the like.

The user input unit 307 may be configured to: receive input digital or character information, and generate key signal input related to a user setting and function control of the electronic device. Optionally, the user input unit 307 includes a touch panel 3071 and another input device 3072. The touch panel 3071, also called a touch screen, may collect touch operation on or near the touch panel by a user (for example, operation on the touch panel 3071 or near the touch panel 3071 by fingers or any suitable objects or accessories such as a touch pen by the user). The touch panel 3071 may include two parts: a touch detection apparatus and a touch controller. The touch detection apparatus detects a touch location of the user, detects a signal carried by a touch operation, and transmits the signal to the touch controller. The touch controller receives touch information from the touch detection apparatus, converts the touch information to touch point coordinates, sends the touch point coordinates to the processor 310, and receives and executes a command from the processor 310. In addition, the touch panel 3071 may be implemented in various types such as a resistor, a capacitor, an infrared ray, or a surface acoustic wave. The user input unit 307 may further include another input device 3072 in addition to the touch panel 3071. Optionally, the another input device 3072 may include but is not limited to a physical keyboard, a functional button (such as a volume control button or a power on/off button), a trackball, a mouse, and a joystick. Details are not described herein.

Optionally, the touch panel 3071 may cover the display panel 3061. When detecting the touch operation on or near the touch panel 3071, the touch panel 3071 transmits the touch operation to the processor 310 to determine a type of a touch event, and then the processor 310 provides corresponding visual output on the display panel 3061 based on the type of the touch event. Although in FIG. 3, the touch panel 3071 and the display panel 3061 are configured as two independent components to implement input and output functions of the electronic device, in some embodiments, the touch panel 3071 and the display panel 3061 can be integrated to implement the input and output functions of the electronic device. Details are not limited herein.

The interface unit 308 is an interface for connecting an external apparatus to the electronic device 300. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, an earphone port, and the like. The interface unit 308 may be configured to receive an input (for example, data information and power) from an external apparatus and transmit the received input to one or more elements in the electronic device 300, or may be configured to transmit data between the electronic device 300 and the external apparatus.

The memory 309 may be configured to store a software program and various pieces of data. The memory 309 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 309 may include a high-speed random access memory, and may further include a nonvolatile memory, for example, at least one magnetic disk storage device, a flash storage device, or another volatile solid-state storage device.

The processor 310 is a control center of the electronic device, connects all parts of the entire electronic device by using various interfaces and lines, and performs various functions of the electronic device and data processing by running or executing a software program and/or a module that are/is stored in the memory 309 and by invoking data stored in the memory 309, to overall monitor the electronic device. The processor 310 may include one or more processing units. Optionally, an application processor and a modem processor may be integrated into the processor 310. The application processor mainly processes an operating system, a user interface, an application program, and the like. The modem processor mainly processes wireless communications. It can be understood that, alternatively, the modem processor may not be integrated into the processor 310.

The electronic device 300 may further include the power supply 311 (for example, a battery) supplying power to each component. Optionally, the power supply 311 may be logically connected to the processor 310 by using a power management system, so as to implement functions such as charging management, discharging management, and power consumption management by using the power management system.

In addition, the electronic device 300 includes some function modules not shown. Details are not described herein.

An embodiment of this application further provides a non-transitory readable storage medium, where the non-transitory readable storage medium stores a program or an instruction, and when the program or the instruction is executed by a processor, the processes of the foregoing embodiments of the transmission processing method are implemented, and a same technical effect can be achieved. To avoid repetition, details are not described herein again.

The processor is a processor in the electronic device in the foregoing embodiments. The non-transitory readable storage medium includes a non-transitory computer-readable storage medium such as a read-only memory (ROM), a random access memory (RAM), a magnetic disk, an optical disc, or the like.

An embodiment of this application still provides a chip. The chip includes a processor and a communications interface, and the communications interface is coupled to the processor. The processor is configured to run a program or an instruction, to implement various processes of the foregoing embodiments of the transmission processing method, and a same technical effect can be achieved. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

Those of ordinary skill in the art can understand that some or all processes of the realization of the foregoing method in the embodiments can be implemented by controlling relevant hardware by the computer program. The foregoing program may be stored on a computer readable storage medium, where when the program is executed, the processes of the embodiments of the foregoing methods can be included. The foregoing storage medium may be a magnetic disk, an optical disc, a read-only memory (ROM), a random access memory (RAM), or the like.

It can be understood that the embodiments described in the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present disclosure, or their combinations.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the foregoing illustrative implementation manners. The foregoing illustrative implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A transmission processing method, performed by a user equipment and comprising:

obtaining a first priority of sidelink reporting information; wherein the sidelink reporting information is reported to a network device through a physical uplink control channel (PUCCH), or a physical uplink shared channel (PUSCH); and determining whether to transmit the sidelink reporting information based on a first priority; wherein the sidelink reporting information comprises:

sidelink reporting information without a priority reference;

wherein the sidelink reporting information without a priority reference satisfies at least one of following:

the sidelink reporting information corresponding to unuse of any sidelink configured grant resources;

the sidelink reporting information corresponding to a canceled sidelink transmission resource; or the sidelink reporting information corresponding to a target transmission type; wherein the target transmission type comprises at least one of following:

blind transmission;

blind retransmission;

transmission with disabled hybrid automatic repeat request (HARQ) feedback;

broadcast transmission;

transmission that not supports HARQ feedback; or transmission in a resource pool, bandwidth part BWP, or a carrier not configured with a physical sidelink feedback channel.

2. The method according to claim 1, wherein after obtaining the first priority of the sidelink reporting information, the method further comprises:

obtaining a second priority of information carried by a preset resource; and determining whether to transmit the sidelink reporting information according to the first priority and/or the second priority; wherein the preset resource is a transmission resource of uplink reporting information, the preset resource is a sidelink transmission resource, or the preset resource is a resource of transmitting uplink data.

3. The method according to claim 1, wherein the sidelink reporting information further comprises:

sidelink reporting information that satisfies a first preset condition;

the sidelink reporting information that satisfies the first preset condition comprises at least one of following:

first sidelink reporting information, comprising only negative acknowledgment;

second sidelink reporting information, comprising negative acknowledgment, wherein the negative acknowledgment corresponds to unicast;

third sidelink reporting information, comprising negative acknowledgment, wherein the negative acknowledgment corresponds to multicast and a feedback mechanism which is an acknowledgment/negative acknowledgment (ACK/NACK) feedback mechanism;

fourth sidelink reporting information, comprising negative acknowledgment, wherein the negative acknowledgment corresponds to multicast and a feedback mechanism which is a NACK-only feedback mechanism;

fifth sidelink reporting information, comprising only acknowledgment;

sixth sidelink reporting information, wherein the sixth sidelink reporting information is sidelink hybrid automatic repeat request information corresponding to unuse of any sidelink configured grant resources;

seventh sidelink reporting information, corresponding to at least one undetected target physical sidelink feedback channel resource;

eighth sidelink reporting information, wherein the eighth sidelink reporting information is corresponding sidelink hybrid automatic repeat request information when the number of sidelink transmission times reaches a preset number of transmission times;

ninth sidelink reporting information, wherein the ninth sidelink reporting information is corresponding sidelink hybrid automatic repeat request information in a case that at least sidelink transmission is performed on one last candidate resource of a preset number of candidate resources; or tenth sidelink reporting information, comprising at least sidelink channel state information.

4. The method according to claim 1, wherein obtaining the first priority of the sidelink reporting information comprises:

determining the first priority as a priority of a canceled sidelink transmission resource in a case that the sidelink reporting information corresponds to the canceled sidelink transmission resource; or determining, in a case that the sidelink reporting information corresponds to a canceled physical sidelink feedback channel resource, the first priority as a priority of a physical sidelink shared channel resource and/or a physical sidelink control channel resource corresponding to the canceled physical sidelink feedback channel resource; or determining the first priority as a priority of a physical sidelink shared channel resource and/or physical sidelink control channel resource for corresponding sidelink transmission in a case that the sidelink reporting information corresponds to a target transmission type.

5. The method according to claim 1, wherein obtaining the first priority of the sidelink reporting information comprises:

determining the first priority as a priority of a physical sidelink shared channel resource and/or a physical sidelink control channel resource for corresponding sidelink transmission in a case that the sidelink reporting information corresponds to at least one undetected target physical sidelink feedback channel resource; or determining the first priority as a priority of a sidelink transmission resource corresponding to sidelink transmission in a case that the sidelink reporting information is corresponding sidelink hybrid automatic repeat request information in a case that a number of sidelink transmission times reaches a preset number of transmission times; or determining, in a case that the sidelink reporting information is corresponding sidelink hybrid automatic repeat request information in a case that at least sidelink transmission is performed on the last candidate resource of a preset number of candidate resources, the first priority as a priority of a sidelink transmission resource corresponding to the sidelink transmission.

6. The method according to claim 1, wherein the first priority is the lowest priority of priorities corresponding to target resources, and the target resources are a resource set where a sidelink transmission resource corresponding to the sidelink reporting information is located; or the first priority is the lowest priority of preset priorities.

7. The method according to claim 6, wherein the target resources comprise at least one of following:

sidelink configured grant resources;

a resource pool;

bandwidth parts; or carriers.

8. The method according to claim 2, wherein determining whether to transmit the sidelink reporting information according to the first priority and/or the second priority comprises:

determining, in a case that a second preset condition is satisfied between a transmission resource of the sidelink reporting information and the preset resource, whether to transmit the sidelink reporting information according to the first priority and/or the second priority; wherein the second preset condition is that time domains and/or frequency domains overlap at least partially; or the second preset condition is being in a same time domain range, and/or in a same frequency domain range.

9. The method according to claim 2, wherein the sidelink transmission resource comprises at least one of following:

a physical sidelink shared channel resource;

a physical sidelink control channel resource; or a physical sidelink feedback channel resource.

10. An electronic device, comprising: a processor, a memory, and a program or an instruction that is stored in the memory and executable on the processor, wherein the program or the instruction, when executed by the processor, causes the electronic device to perform:

obtaining a first priority of sidelink reporting information; wherein the sidelink reporting information is reported to a network device through a physical uplink control channel (PUCCH), or a physical uplink shared channel (PUSCH); and determining whether to transmit the sidelink reporting information based on a first priority; wherein the sidelink reporting information comprises:

sidelink reporting information without a priority reference;

wherein the sidelink reporting information without a priority reference satisfies at least one of following:

the sidelink reporting information corresponding to unuse of any sidelink configured grant resources;

the sidelink reporting information corresponding to a canceled sidelink transmission resource; or the sidelink reporting information corresponding to a target transmission type; wherein the target transmission type comprises at least one of following:

blind transmission;

blind retransmission;

transmission with disabled hybrid automatic repeat request (HARQ) feedback;

broadcast transmission;

transmission that not supports HARQ feedback; or transmission in a resource pool, bandwidth part BWP, or a carrier not configured with a physical sidelink feedback channel.

11. The electronic device according to claim 10, wherein the program or the instruction, when executed by the processor, causes the electronic device to further perform:

obtaining a second priority of information carried by a preset resource; and determining whether to transmit the sidelink reporting information according to the first priority and/or the second priority; wherein the preset resource is a transmission resource of uplink reporting information, the preset resource is a sidelink transmission resource, or the preset resource is a resource of transmitting uplink data.

12. The electronic device according to claim 10, wherein the sidelink reporting information further comprises:

sidelink reporting information that satisfies a first preset condition;

the sidelink reporting information that satisfies the first preset condition comprises at least one of following:

first sidelink reporting information, comprising only negative acknowledgment;

second sidelink reporting information, comprising negative acknowledgment, wherein the negative acknowledgment corresponds to unicast;

third sidelink reporting information, comprising negative acknowledgment, wherein the negative acknowledgment corresponds to multicast and a feedback mechanism which is an acknowledgment/negative acknowledgment (ACK/NACK) feedback mechanism;

fourth sidelink reporting information, comprising negative acknowledgment, wherein the negative acknowledgment corresponds to multicast and a feedback mechanism which is a NACK-only feedback mechanism;

fifth sidelink reporting information, comprising only acknowledgment;

sixth sidelink reporting information, wherein the sixth sidelink reporting information is sidelink hybrid automatic repeat request information corresponding to unuse of any sidelink configured grant resources;

seventh sidelink reporting information, corresponding to at least one undetected target physical sidelink feedback channel resource;

eighth sidelink reporting information, wherein the eighth sidelink reporting information is corresponding sidelink hybrid automatic repeat request information when the number of sidelink transmission times reaches a preset number of transmission times;

ninth sidelink reporting information, wherein the ninth sidelink reporting information is corresponding sidelink hybrid automatic repeat request information in a case that at least sidelink transmission is performed on one last candidate resource of a preset number of candidate resources; or tenth sidelink reporting information, comprising at least sidelink channel state information.

13. The method according to claim 10, wherein the program or the instruction, when executed by the processor, causes the electronic device to further perform:

determining the first priority as a priority of a canceled sidelink transmission resource in a case that the sidelink reporting information corresponds to the canceled sidelink transmission resource; or determining, in a case that the sidelink reporting information corresponds to a canceled physical sidelink feedback channel resource, the first priority as a priority of a physical sidelink shared channel resource and/or a physical sidelink control channel resource corresponding to the canceled physical sidelink feedback channel resource; or determining the first priority as a priority of a physical sidelink shared channel resource and/or physical sidelink control channel resource for corresponding sidelink transmission in a case that the sidelink reporting information corresponds to a target transmission type.

14. The method according to claim 10, wherein the program or the instruction, when executed by the processor, causes the electronic device to further perform:

determining the first priority as a priority of a physical sidelink shared channel resource and/or a physical sidelink control channel resource for corresponding sidelink transmission in a case that the sidelink reporting information corresponds to at least one undetected target physical sidelink feedback channel resource; or determining the first priority as a priority of a sidelink transmission resource corresponding to sidelink transmission in a case that the sidelink reporting information is corresponding sidelink hybrid automatic repeat request information in a case that a number of sidelink transmission times reaches a preset number of transmission times; or determining, in a case that the sidelink reporting information is corresponding sidelink hybrid automatic repeat request information in a case that at least sidelink transmission is performed on the last candidate resource of a preset number of candidate resources, the first priority as a priority of a sidelink transmission resource corresponding to the sidelink transmission.

15. The method according to claim 10, wherein the first priority is the lowest priority of priorities corresponding to target resources, and the target resources are a resource set where a sidelink transmission resource corresponding to the sidelink reporting information is located; or the first priority is the lowest priority of preset priorities.

16. The method according to claim 15, wherein the target resources comprise at least one of following:

sidelink configured grant resources;

a resource pool;

bandwidth parts; or carriers.

17. The method according to claim 11, wherein the program or the instruction, when executed by the processor, causes the electronic device to further perform:

determining, in a case that a second preset condition is satisfied between a transmission resource of the side-link reporting information and the preset resource, whether to transmit the sidelink reporting information according to the first priority and/or the second priority; wherein the second preset condition is that time domains and/or frequency domains overlap at least partially; or the second preset condition is being in a same time domain range, and/or in a same frequency domain range.

18. A non-transitory readable storage medium, wherein the non-transitory readable storage medium stores a program or an instruction, and when the program or the instruction is executed by a processor, the following steps are implemented:

obtaining a first priority of sidelink reporting information; wherein the sidelink reporting information is reported to a network device through a physical uplink control channel (PUCCH), or a physical uplink shared channel (PUSCH); and determining whether to transmit the sidelink reporting information based on a first priority; wherein the sidelink reporting information comprises:

sidelink reporting information without a priority reference;

wherein the sidelink reporting information without a priority reference satisfies at least one of following:

the sidelink reporting information corresponding to unuse of any sidelink configured grant resources;

the sidelink reporting information corresponding to a canceled sidelink transmission resource; or the sidelink reporting information corresponding to a target transmission type; wherein the target transmission type comprises at least one of following:

blind transmission;

blind retransmission;

transmission with disabled hybrid automatic repeat request (HARQ) feedback;

transmission that not supports HARQ feedback; or transmission in a resource pool, bandwidth part BWP, or a carrier not configured with a physical sidelink feedback channel.

\* \* \* \* \*